(12) United States Patent
Kamachi et al.

(10) Patent No.: US 6,970,812 B2
(45) Date of Patent: Nov. 29, 2005

(54) VIRTUAL-SPACE PROVIDING APPARATUS, VIRTUAL-SPACE PROVIDING SYSTEM, AND VIRTUAL-SPACE PROVIDING METHOD

(75) Inventors: Teruhisa Kamachi, Tokyo (JP); Hiroshi Nakazawa, Saitama (JP); Satoru Matsuda, Kanagawa (JP); Kenichi Fukahori, Kanagawa (JP); Tsuyoshi Ono, Tokyo (JP)

(73) Assignee: Sony Corporation, Tokyo (JP)

( * ) Notice: Subject to any disclaimer, the term of this patent is extended or adjusted under 35 U.S.C. 154(b) by 828 days.

(21) Appl. No.: 09/681,975

(22) Filed: Jul. 2, 2001

(65) Prior Publication Data

US 2002/0002514 A1   Jan. 3, 2002

(30) Foreign Application Priority Data

Jun. 30, 2000   (JP) ............................ P2000-199664

(51) Int. Cl.7 ........................ G06F 17/60; G06G 7/48; G06K 15/00
(52) U.S. Cl. ........................... 703/6; 703/24; 235/383; 705/26; 705/27
(58) Field of Search ..... 703/24, 6; 235/383; 705/26–27

(56) References Cited

U.S. PATENT DOCUMENTS

| | | | |
|---|---|---|---|
| 5,025,372 A * | 6/1991 | Burton et al. | 705/14 |
| 5,774,870 A * | 6/1998 | Storey | 705/14 |
| 5,848,399 A * | 12/1998 | Burke | 705/27 |
| 5,926,179 A * | 7/1999 | Matsuda et al. | 345/355 |
| 6,026,376 A * | 2/2000 | Kenney | 705/27 |
| 6,026,377 A * | 2/2000 | Burke | 705/27 |
| 6,381,583 B1 * | 4/2002 | Kenney | 705/26 |
| 6,594,640 B1 * | 7/2003 | Postrel | 705/14 |
| 6,604,681 B1 * | 8/2003 | Burke et al. | 235/383 |
| 6,727,925 B1 * | 4/2004 | Bourdelais | 715/852 |
| 6,750,848 B1 * | 6/2004 | Pryor | 345/168 |

OTHER PUBLICATIONS

Mass, Yosi et al. "VRCommerce—Electronic Commerce in Virtual Reality". Proc. of the 1st ACM Conf. on Electronic Commerce. Nov. 1999. pp. 103-109.*

Sugano, H. et al. "SpaceFusion: A Multi-Server Architecture for Shared Virtual Environments." Proc. of the 2nd Symposium on Virtual Reality Modeling Language. 1997. pp. 51-58.*

The Virtual Reality Modeling Language (VRML) Version 1.0 Specification. Nov. 9, 1995. http://www.web3d.org/x3d/specifications/vrml/VRML1.0/index.html.*

(Continued)

*Primary Examiner*—Paul L. Rodriguez
*Assistant Examiner*—Ayal Sharon
(74) *Attorney, Agent, or Firm*—Bell, Boyd & Lloyd LLC

(57) ABSTRACT

Disclosed is a virtual-space providing apparatus, which is connected to a user terminal via a network, and which provides the user terminal with various kinds of services through a three-dimensional virtual space created in the network, the virtual-space providing apparatus includes a virtual room providing server for imitating a real room of a user using the user terminal, and for providing the virtual room, which can be browsed using the user terminal connected via the network, on the three-dimensional virtual space; virtual store providing server for providing the user terminal connected via the network with the virtual store, the virtual store selling virtual commodities imitating real commodities, on the three-dimensional virtual space; and a benefit-information transmitting medium, wherein, when the user purchases a virtual commodity in the virtual store provided by the virtual store providing server using the user terminal, benefit information showing benefit of purchasing the virtual commodity is transmitted to the user terminal.

7 Claims, 13 Drawing Sheets

OTHER PUBLICATIONS

Underwood, L. "Make House a Home, with Net's Help." Star Tribune. Minneapolis, Minn.: Jun. 15, 2000. p. 2.*

"Furniture.com Security Policy". May 10, 2000. Printed from www.archive.org on Apr. 13, 2005.*

"Furniture.com FAQ". May 10, 2000. Printed from www.archive.org on Apr. 13, 2005.*

"Furniture.com Site Map". May 10, 2000. Printed from www.archive.org on Apr. 13, 2005.*

"Furniture.com Homepage". May 10, 2000. Printed from www. archive.org on Apr. 13, 2005.*

Archive.org search results for "http://furniture.com". Printed on Apr. 13, 2005. http://web.archive.org/web/*/http://furniture.com.*

Ward, J.T. "Home Furnishings, Modern and Classic, From the Internet." The New York Times. Sep. 9, 1999. p. F.5.*

Ward, J.T. "Some Go on Line to Buy Furniture . . . And Some Get In Line." The New York Times. Sep. 9, 1999. p. F.1.*

Brian, Laurie. "Wired for Shopping / The Internet Brings the Furniture Showroom into the Living Room." San Francisco Chronicle. Feb. 9, 2000. p. 1.Z.1.*

Doten, Patti. "Mapping the Web: A Host of Housewares a Click Away." Boston Globe. Jan. 13, 2000. p. E.1.*

Microsoft Press Computer User's Dictionary. © 1998. p. 320.*

\* cited by examiner

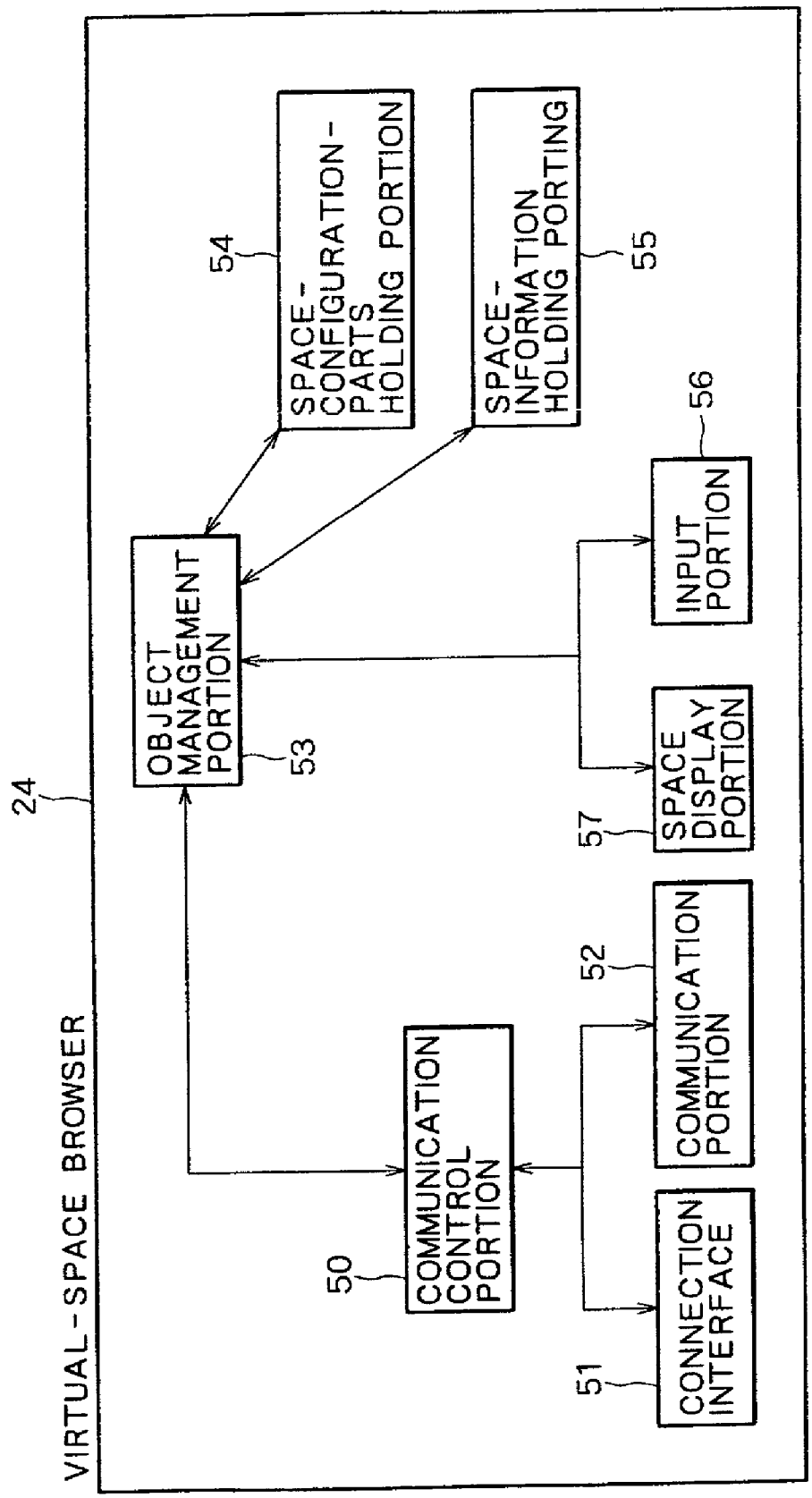

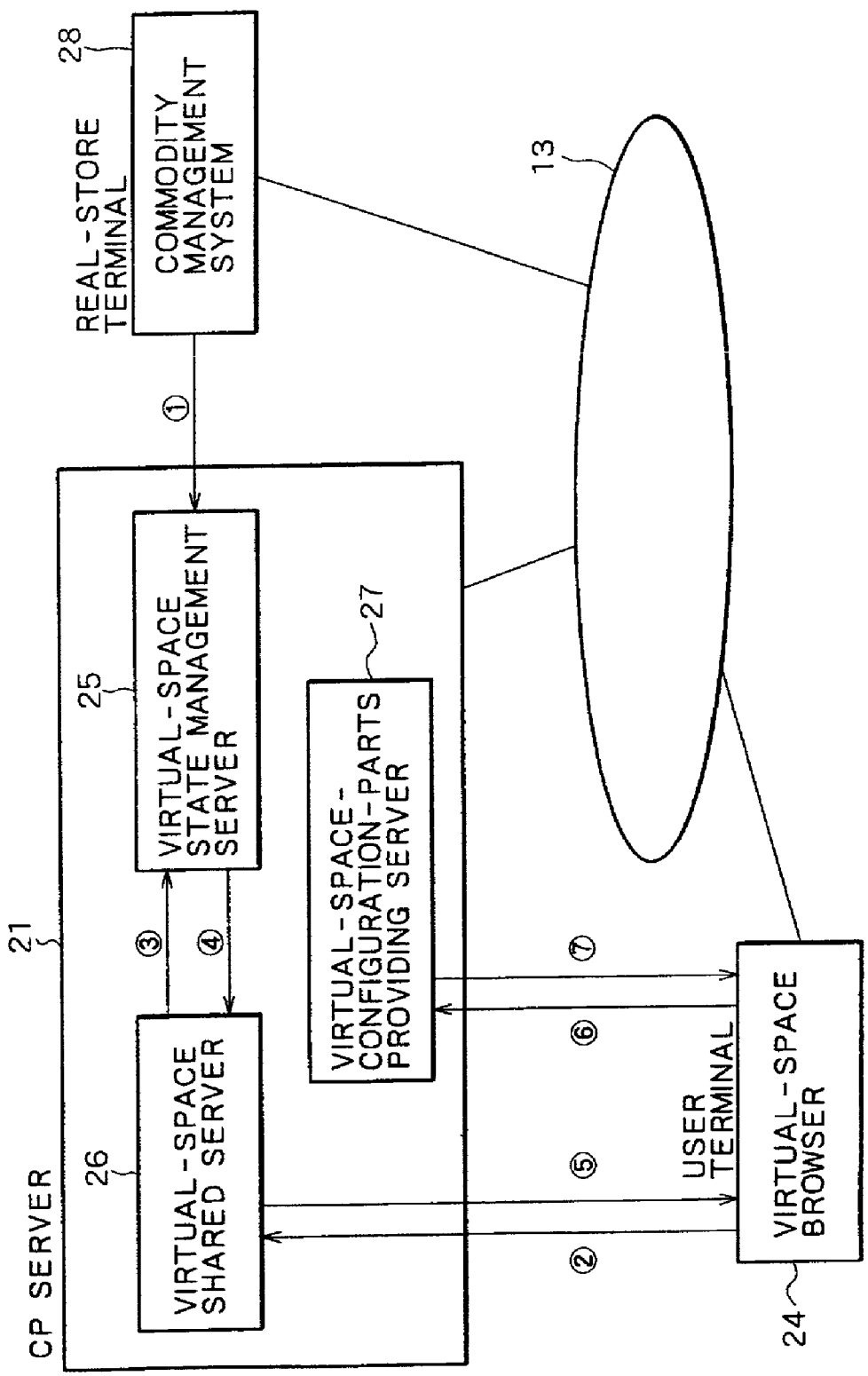

VIRTUAL-SPACE PROVIDING APPARATUS, VIRTUAL-SPACE PROVIDING SYSTEM, AND VIRTUAL-SPACE PROVIDING METHOD

BACKGROUND OF THE INVENTION

The present invention relates to a virtual-space providing apparatus, a virtual-space providing system, and a virtual-space providing method, by which services such as communication with other users, and purchase of a commodity, are provided in a virtual space.

As high-performance personal computers for individual use and the Internet has come into wider use, the Internet have been used to build a virtual space on a server, which provides a user with services that enable communication with other users, purchase of commodities, and the like, in the virtual space.

However, as far as the present state of the art is concerned, for example, if a user wishes to provide a simulation by building a user's own room (existing in a real space) into a virtual space, the user cannot perform the simulation in the room built into the virtual space before actually making a purchase. In addition, even if the user actually places a purchased commodity in the real-space room, the user cannot reflect the commodity in the virtual-space room. As described above, the virtual space is nothing more than an imaginary space that exists in a virtual world. Therefore, there was the following problem: it is not possible to associate experience, action, and the like, in the real space with the virtual space.

SUMMARY OF THE INVENTION

It is thus an object of the present invention to provide a virtual-space providing apparatus, a virtual-space providing system, and a virtual-space providing method, which can associate experience, action, and the like, in the real space with a space state of the virtual space.

In carrying out the invention and according to a first aspect thereof, there is provided a virtual-space providing apparatus which is connected to a user terminal via a network, and which provides the user terminal with various kinds of services through a three-dimensional virtual space created in the network, the virtual-space providing apparatus including a virtual room providing server for providing virtual room data for imitating a real room of a user using the user terminal, and for providing the virtual room, which can be browsed using the user terminal connected via the network, on the three-dimensional virtual space; virtual store providing server for providing the user terminal connected via the network with a virtual store, the virtual store selling virtual commodities imitating real commodities, on the three-dimensional virtual space; and benefit-information transmitting medium, wherein, when the user purchases a virtual commodity in the virtual store provided by the virtual store providing server using the user terminal, benefit information showing benefit of purchasing the virtual commodity is transmitted to the user terminal.

In carrying out the invention and according to a second aspect thereof, there is provided a virtual-space providing system, which is connected via a network to a user terminal used by a user, a real-store terminal installed in a store in a real space, and a virtual-space providing apparatus providing the user terminal with various kinds of services through a three-dimensional virtual space, wherein the virtual-space providing apparatus includes a virtual room providing means for imitating a real room of the user using the user terminal, and for providing a virtual room, which can be browsed using the user terminal connected via the network, on the three-dimensional virtual space; virtual store providing server for providing the user terminal connected via the network with a virtual store selling virtual commodities imitating real commodities, on the three-dimensional virtual space; and benefit-information transmitting medium for transmitting benefit information to the user terminal so that in the space the user can get benefit of purchasing a virtual commodity, when the virtual commodity is purchased in the virtual store provided by the virtual store providing server; and the user terminal includes a removable storage medium; and writer for writing the benefit information transmitted from the benefit-information transmitting medium, on the storage medium.

In carrying out the invention and according to a third aspect thereof, there is provided a virtual-space providing method for providing a user terminal connected via a network, with various kinds of services through a three-dimensional virtual space created in the network, the method includes the steps of: providing a virtual room imitating a real room of a user using the user terminal, on a three-dimensional virtual space so that the virtual room can be browsed using the user terminal connected via the network; and providing a virtual store for selling virtual commodities, which can be placed in the virtual room, on the three-dimensional virtual space; wherein when a virtual commodity is purchased in the virtual store using the user terminal, benefit of purchasing the virtual commodity is given to the user terminal side so that the user can enjoy the benefit in a real store.

With this configuration, according to the present invention, virtual room providing server imitates a real room of the user who uses the user terminal, and provides a virtual room, which can be browsed using the user terminal connected via the network, on the three-dimensional virtual space; virtual store providing server provides the user terminal connected via the network with a virtual store, which sells virtual commodities imitating real commodities, on the three-dimensional virtual space; and when a virtual commodity is purchased in the virtual store using the user terminal, and a benefit-information transmitting medium transmits benefit information, which shows benefit of purchasing the virtual commodity, to the user terminal.

Moreover, when a commodity is purchased in the real store, the virtual store providing server places a virtual commodity, which imitates the real commodity, in the virtual room.

Therefore, association of experience, action, and the like, in the real space with a space state of the virtual space becomes possible.

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWINGS

FIG. 12 is a block diagram illustrating a configuration of a virtual-space browser.

FIG. 13 is a conceptual diagram illustrating operation of a second embodiment.

DETAILED DESCRIPTION OF THE INVENTION

Embodiments of the present invention are described with reference to drawings as below.

First Embodiment

A first embodiment of the invention is set forth below.

Configuration of First Embodiment

Figure 1:
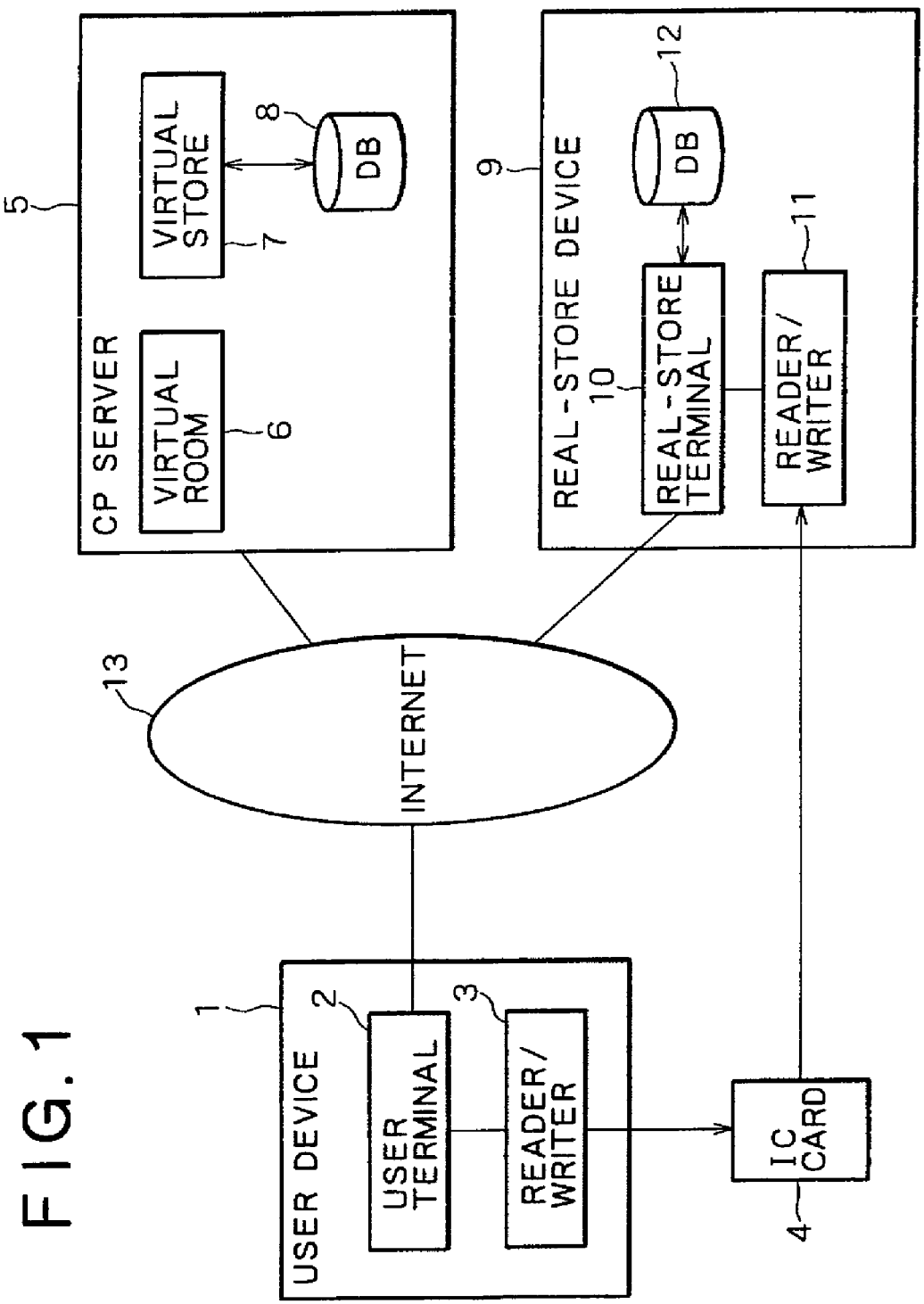
FIG. 1 is a block diagram illustrating a system configuration of a first embodiment according to the present invention.

FIG. 1 is a block diagram illustrating a system configuration of a first embodiment of the present invention. A user device 1 is a device placed on the user sides and includes at least a user terminal 2 and a reader/writer 3. The user terminal 2 comprises a personal computer, etc., which can be connected to a network 13 such as the Internet. The reader/writer 3 writes various kinds of information on a storage medium such as an IC card 4, and reads various kinds of information stored in a storage medium. Use of the IC card 4 is described below. The user terminal 2 is provided with software (browser) that can enjoy various kinds of services through a user's own virtual room and a virtual store (both of them are virtual three-dimensional spaces). The virtual room and the virtual store are provided on a server, e.g., CP (Community Place TM) server 5 described later. At the user terminal 2, the user uses a given tool (room editor) to make a virtual room in a virtual space provided by the CP server 5, which is described later, usually in such a manner that the user imitates a user's own real room. In the virtual room, arrangement of a real room, arrangement of furniture, and the like, are simulated as they are.

The CP server 5 is connected to a network 13, and provides the user, who accesses the CP server 5 via the network 13, with at least a virtual room 6 and a virtual store 7. Although there is only one virtual room 6 in an example shown in FIG. 1, the virtual room 6 is provided for each user. In addition, as is the case with the virtual room 6, the virtual store 7 is also provided for each user although there is only one virtual store 7 shown in the example of FIG. 1. The virtual store 7 is available for many and unspecified persons or for users who have been registered beforehand. The virtual store 7 sells virtual commodities (virtual objects) to the user. The virtual commodity imitates a real commodity, and is placed in the virtual room 6 in response to a scale of the virtual room 6. To be more specific, when the user purchases furniture for the user's own virtual room 6 from the virtual store 7 in a virtual space, for example, from a furniture store, the user can simulate arrangement of the furniture, a size of the furniture, and the like. A virtual-commodity database 8 is provided for the purpose of managing commodities handled by the virtual store 7.

A real-store device 9 is a device placed on the real-store side, and comprises at least a real-store terminal 10 and a reader/writer 11. The real-store terminal 10 is installed in a real store corresponding to the virtual store 7 that is provided by the CP server 5. The real-store terminal 10 is a terminal that can be connected to the network 13. The real-store terminal 10 has a commodity management database 12 linked with the virtual-commodity database 8 of the virtual store 7 in the CP server 5. The commodity management database 12 is provided for the purpose of managing commodities handled by the real store.

Correspondence Between Real Space and Virtual Space

Figure 2:
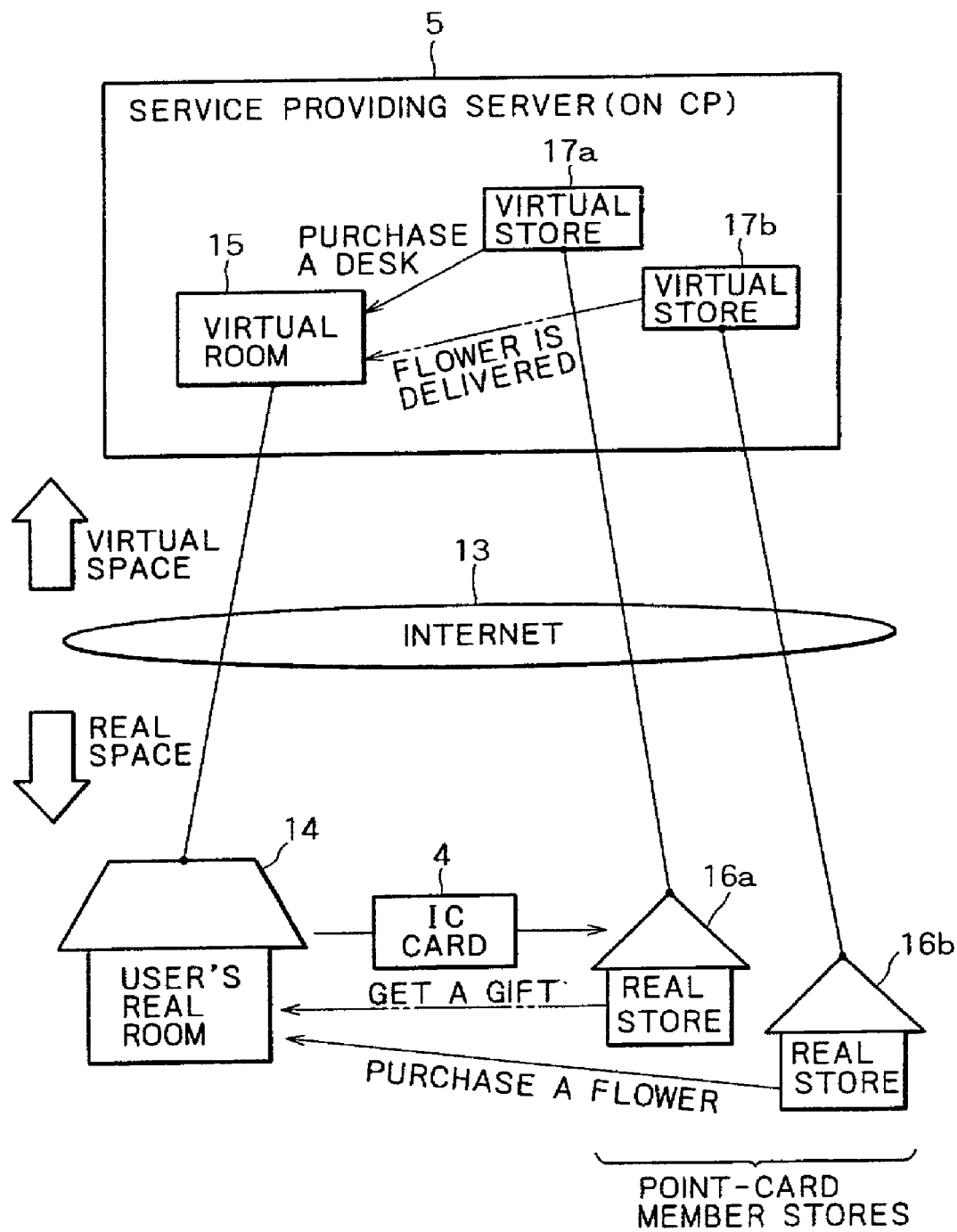
FIG. 2 is a conceptual diagram illustrating correspondence between a real space and a virtual space.

Next, FIG. 2 is a conceptual diagram illustrating correspondence between a real space and a virtual space. On the CP server 5, as described above, a virtual room 15 (equivalent to the virtual room 6 of FIG. 1) corresponding to a user's room 14 in the real space, and virtual stores 17a, 17b (equivalent to the virtual store 7 of FIG. 1) corresponding to stores 16a, 16b in the real space (equivalent to the real store 9 of FIG. 1) are configured via the network 13 such as the Internet. When the user purchases a "desk" in the virtual store 17a, its image data is placed in the virtual room 15. The user can decide a position of the "desk" freely. Using simulation in the virtual room 17a, the user can judge whether or not the user actually purchases the above-mentioned "desk". Additionally, if the commodity impresses the user favorably, clicking the commodity (image) on the virtual space by the user enables on-line shopping on the network 13, which allows the user to purchase a real commodity.

Moreover, on the user side, benefit information from the real store 16a corresponding to the above-mentioned virtual store 17a is recorded in an IC card 4. The user can enjoy services (gifts, etc.) equivalent to the benefit information by bringing the IC card 4 to the real store 16a. In this connection, if the real store 16a is one of point-card member stores, or the like, the user may also enjoy the corresponding service by bringing the IC card 4 to a point-card member store other than the real store 16a corresponding to the virtual store 17a where the user purchased the "desk". Furthermore, when the user purchases a "flower" in the real store 16b, a "flower", which is a virtual commodity corresponding to the "flower" as a real commodity (that is to say, its image data), is delivered to the virtual room 15 from the virtual store 17b corresponding to the real store 16b.

Operation of First Embodiment

Next, operation of the first embodiment described above is explained.

Purchasing a Virtual Commodity from the Virtual Store

Figure 3:
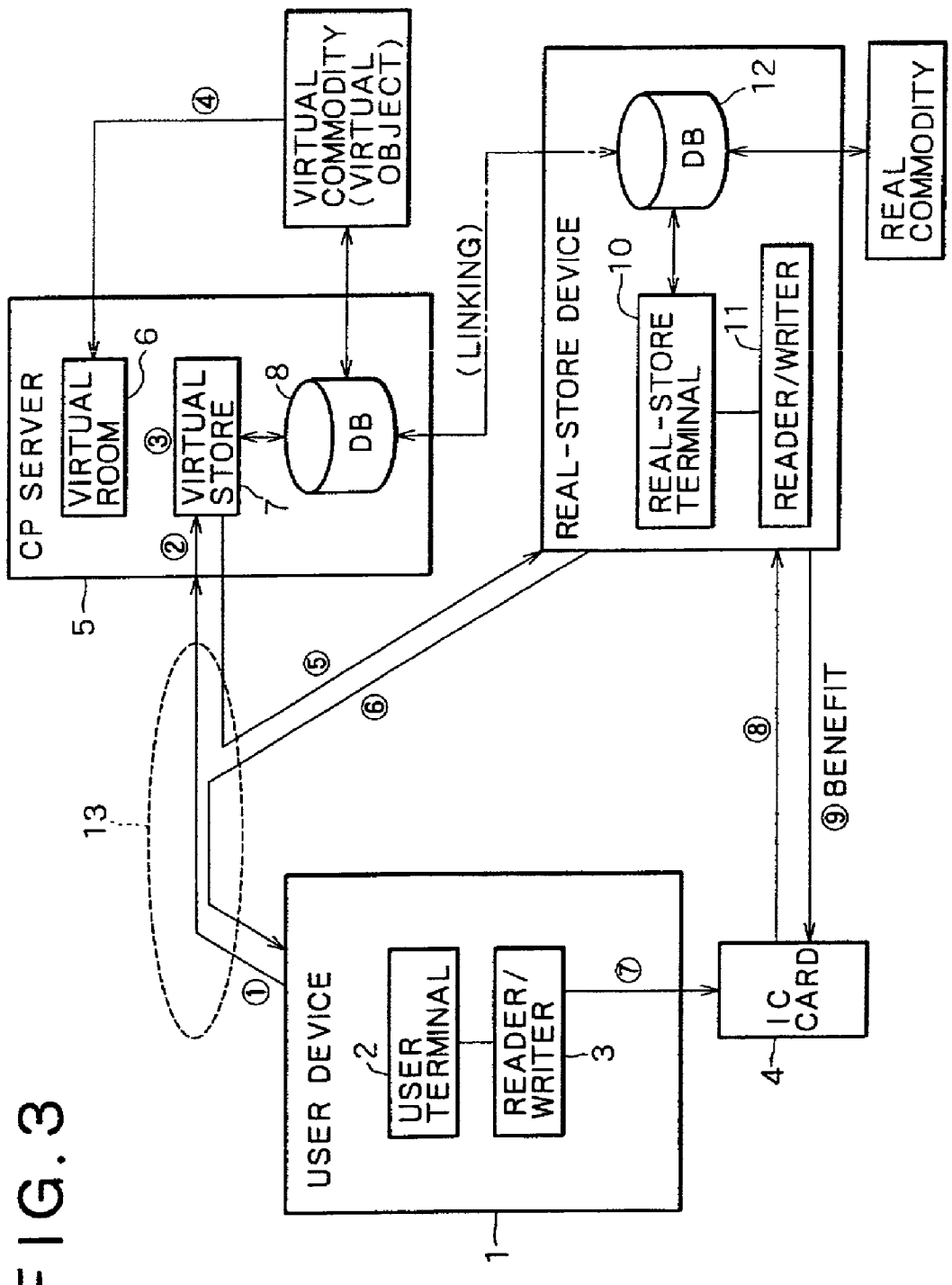
FIG. 3 is a conceptual diagram illustrating operation executed when purchasing a virtual commodity from a virtual store.
Figure 4:
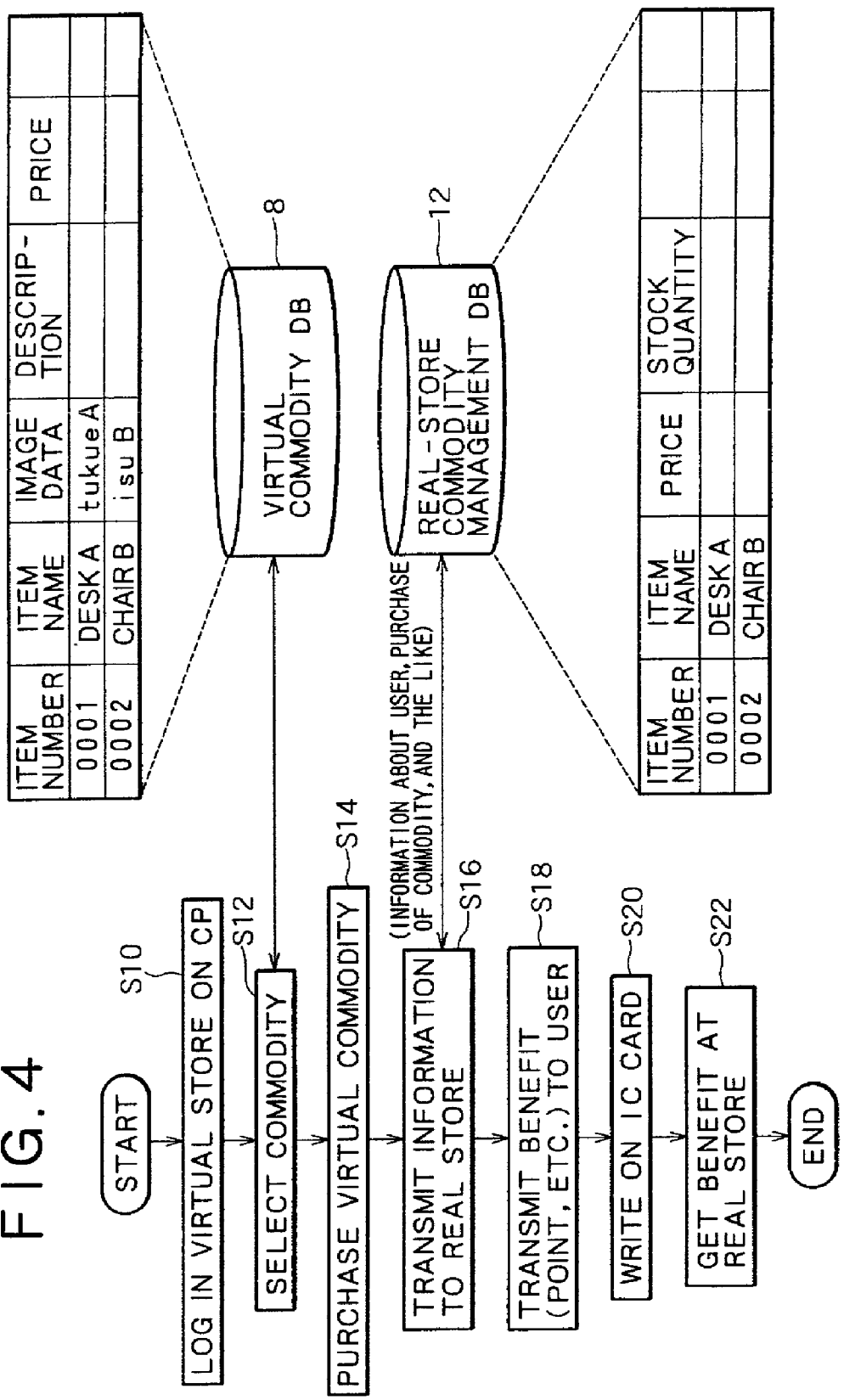
FIG. 4 is a flowchart illustrating operation executed when purchasing a virtual commodity from a virtual store.

In the first place, a case where the user purchases a virtual commodity from the virtual store 7 is described. Here, FIG. 3 is a conceptual diagram for describing the above-mentioned operation. FIG. 4 is a flowchart. In a step S10, the user accesses the CP server 5 via the network 13 such as the Internet using the user terminal 2 (1 in FIG. 3), and logs in the virtual store 7 on the CP server 5 (2 in FIG. 3). Next, in a step S12, the user selects a virtual commodity. In a step S13, the user purchases the desired virtual commodity (desk, etc.) (3 in FIG. 3).

It is to be noted that the user performs user registration in the virtual store 7 beforehand, or performs the user registration on the spot. At this time, the CP server 5 refers to the virtual-commodity database 8 of the virtual store 7, and then places image data corresponding to the purchased virtual commodity in the user's virtual room 6 (4 in FIG. 3). Because the virtual commodity is adjusted to the virtual world in size, bringing the virtual commodity to the user's virtual room 6 enables the user to simulate its arrangement, size, and the like. Using the simulation in the virtual room 6, the user judges whether or not the user actually desires to purchase the above-mentioned commodity (desk). If the user purchases the commodity, clicking the commodity (image) on the virtual room 6 by the user enables on-line shopping on the network 13, which allows the user to purchase a real commodity.

Next, in a step S16, the CP server 5 transfers information including commodities selected by the user to the real-store terminal 10, which exists on the real-store side, via the network 13 (5 in FIG. 3). In the real-store terminal 10, the commodity management database 12 is updated in response to the commodities purchased in the virtual space. In a step S18, benefit information (points, etc.) is transmitted from the real-store terminal 10 to the user terminal 2 via the network 13 (6 in FIG. 3). In a step S20, in the user terminal 2, the benefit information is written to the IC card 4 by the reader/writer 3 (7 of the FIG. 3). In a step S22, when the user brings the IC card 4, on which the benefit information is written, to the real store (8 in FIG. 3), the real store provides the user with services (gift, etc.) that are equivalent to the benefit information ( in FIG. 3).

In this manner, because it is possible to do simulation in the virtual space before actually purchasing a commodity, it is very effective in selecting an especially expensive commodity or a large commodity. In addition, because the service includes a benefit, the user can get a gift only by purchasing commodities in the virtual space. As a result, the user will have many chances to visit the real store, which leads to sales promotion. In the above-mentioned description, the CP server 5 is used for simulation. However, other devices, which can simulate the virtual space, may be used. In addition, concerning the transfer of a benefit, the example in which the IC card 4 is used is described. However, electronic money, a credit card, a debit card, or the like, may alternatively be used as a medium.

Purchasing a Commodity in the Real Store

Figure 5:
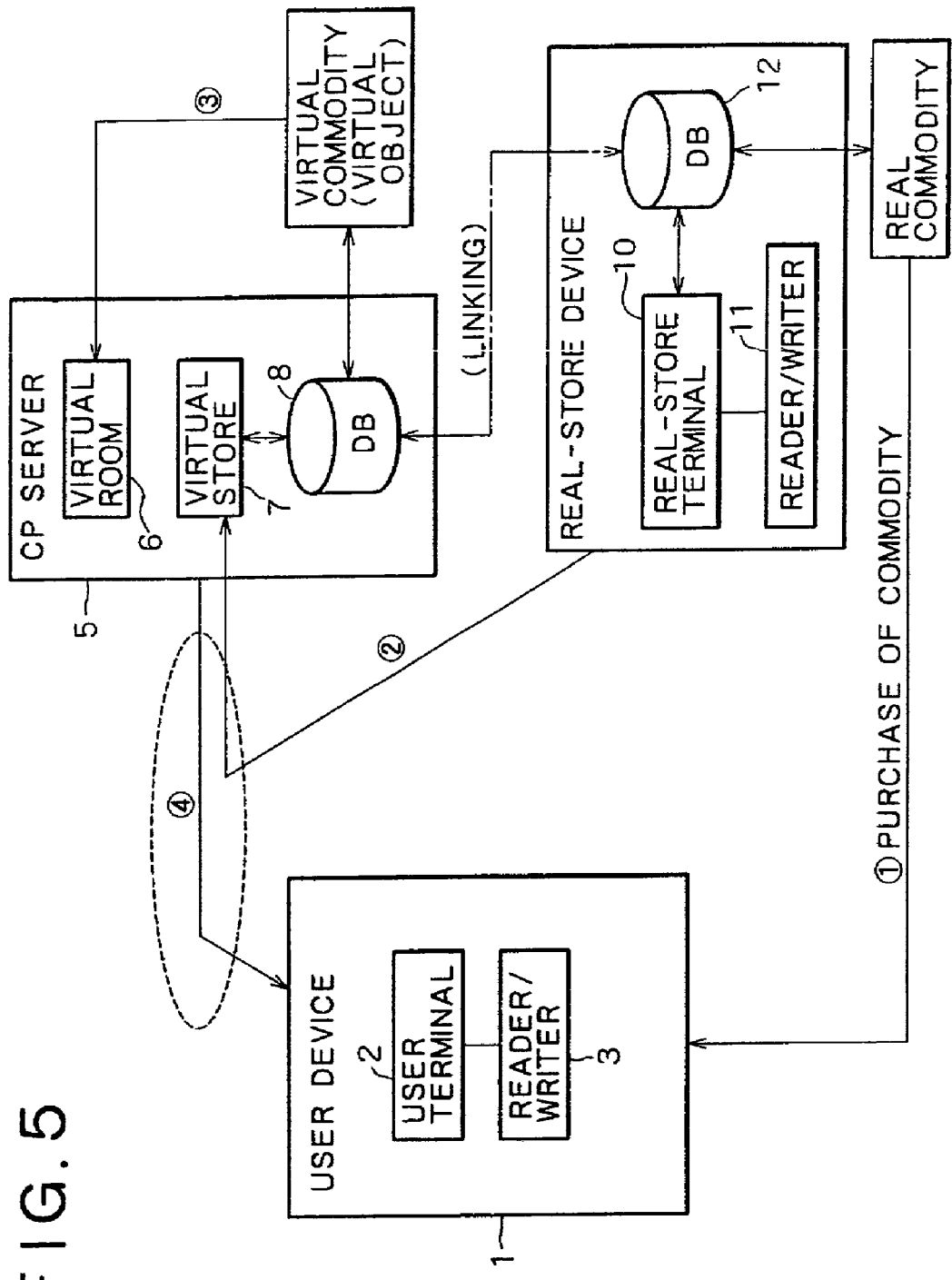
FIG. 5 is a conceptual diagram illustrating operation executed when purchasing a commodity at a real store.
Figure 6:
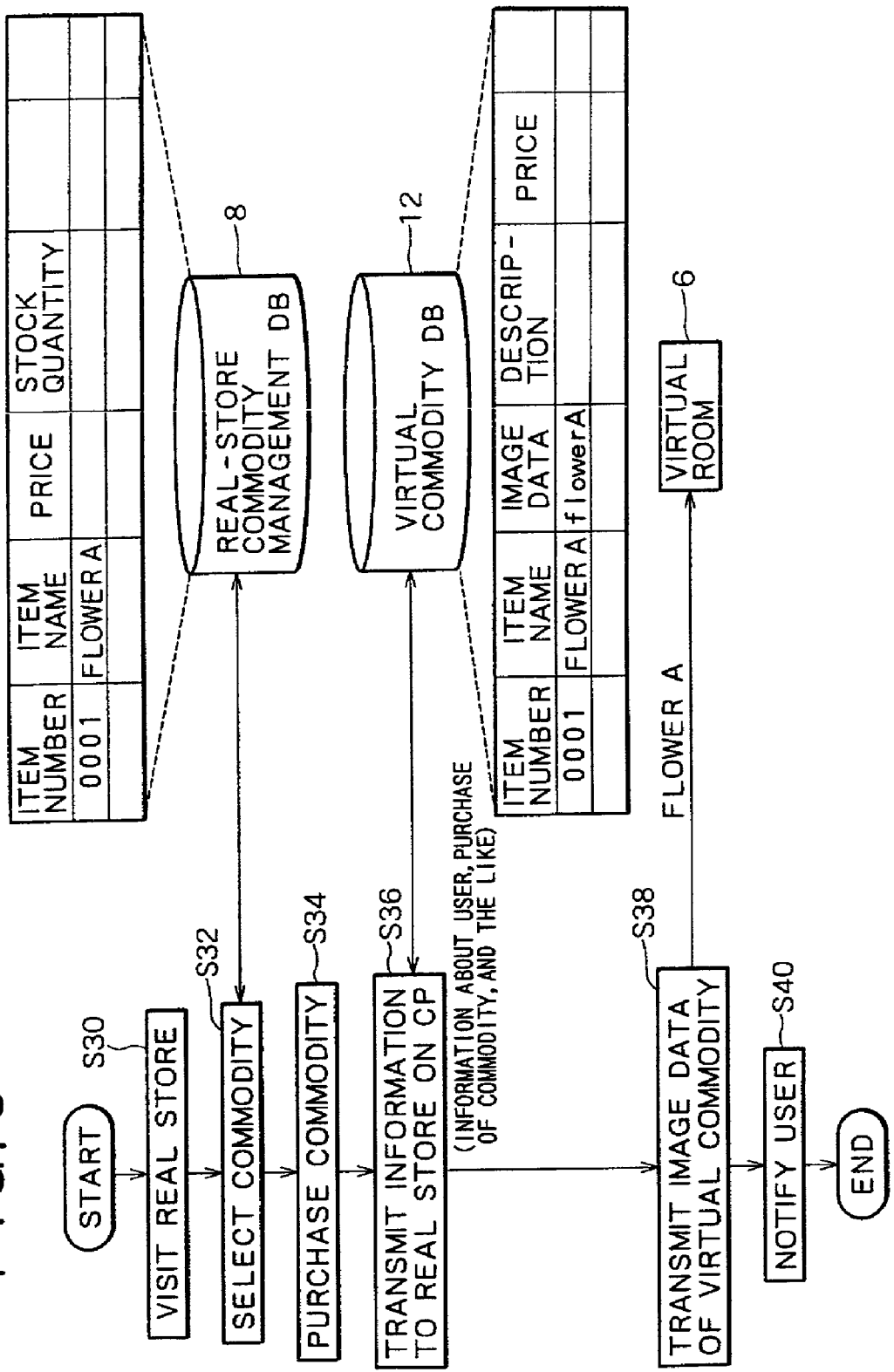
FIG. 6 is a flowchart illustrating operation executed when purchasing a commodity at a real store.

Next, a case where the user purchases a commodity in the real store is described. FIG. 5 is a conceptual diagram for describing the above-mentioned operation. FIG. 6 is a flowchart of the operation. In a step S30, the user visits the real store. In a step S32, the user selects the commodity he or she wishes to purchase. In a step S34, the user purchases the desired commodity (flower, etc.) (1 in FIG. 5). In the real store, stock of the purchased commodities, and the like, are managed in the commodity management database 12 using the real-store terminal 10. Additionally, in a step S36, the real-store terminal 10 automatically transmits information, which is to the effect that the user purchased a "flower", to the virtual store 7 on the CP server 5 via the network 13 (2 in FIG. 5).

In a step S38, in the CP server 5, the virtual-commodity database 8 of the virtual store 7 is referred to according to the information from the real-store terminal 10 described above. A "flower" as a virtual commodity corresponding to the "flower", which is the purchased commodity, is retrieved. Then, the image data of the commodity, in this case, a "flower" is delivered to the virtual room 6 (3 in FIG. 5). After that, in a step 540, the CP server 5 automatically transmits, to the user, an e-mail to the effect that the "flower" has been delivered to the virtual room 6 (4 in FIG. 5). In reality, the e-mail is transmitted to a user's mail address, and delivered to the user terminal 2 via a mail server.

In this manner, when the user purchases a commodity in the real store, the same commodity or a premium commodity appears in the virtual room 6 on the CP server 5. Therefore, the user can reflect experience, action, etc. of the real space in the virtual space; or the user can link them with the virtual space.

It is to be noted that, in the first embodiment described above, a point is added by purchasing a virtual commodity in the virtual store 7 on the CP server 5. However, the point may be added not only in such a case, but also in the case of on-line shopping, that is to say, a case where the user purchases a real commodity through the virtual store 7 on the CP server 5. In this case, if the point is recorded on the IC card 4, the user can get benefit equivalent to the point when the user brings the IC card 4 to the real store.

Second Embodiment

A second embodiment of the invention is set forth below.

Configuration of Second Embodiment

In a second embodiment, on the assumption that the user purchases a commodity in the real store in the first embodiment described above, a more specific configuration for achieving technology, which delivers a virtual commodity corresponding to the purchased commodity to the virtual room, is provided.

Figure 7:
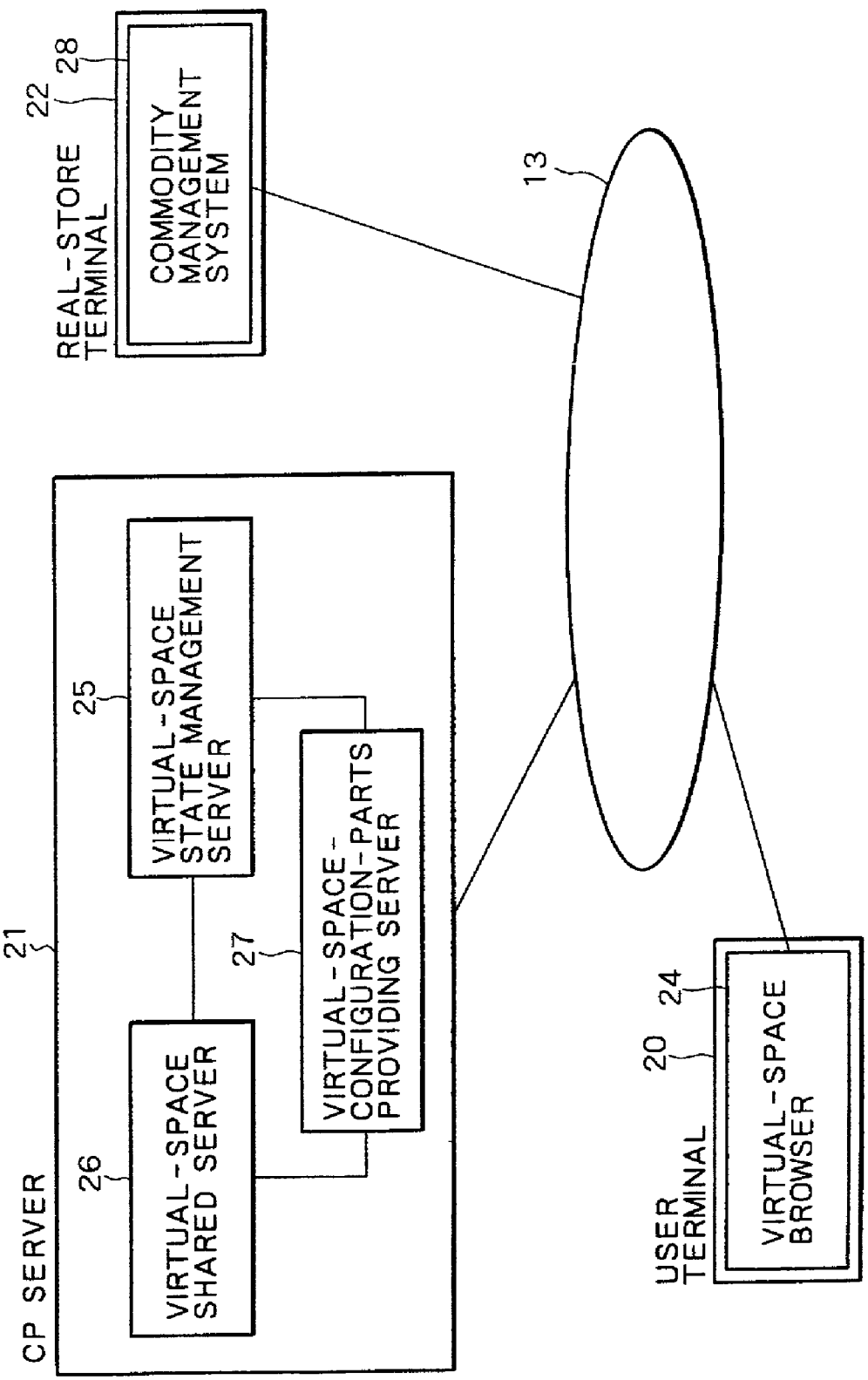
FIG. 7 is a block diagram illustrating a system configuration of a second embodiment according to the present invention.

FIG. 7 is a block diagram illustrating a system configuration of the second embodiment according to the present invention. A user terminal 20 utilized by the user, a CP server 21 for providing a virtual space, and a real-store terminal 22 installed in the real store are connected via a network 13 such as the Internet. The user terminal 20 is a terminal that can be connected to the network 13. Software (virtual space browser) 24 for browsing the virtual space provided by the CP server 21 is installed in the user terminal 20. It is possible to enter a virtual room on the virtual space by establishing a connection with the CP server 21 using the user terminal 20.

The CP server 21 comprises a virtual-space state management server 25, a virtual-space shared server 26, and a virtual-space-configuration-parts providing server 27. The CP server 21 holds a state of a user's virtual room, and performs sharing service with the other users.

Figure 8:
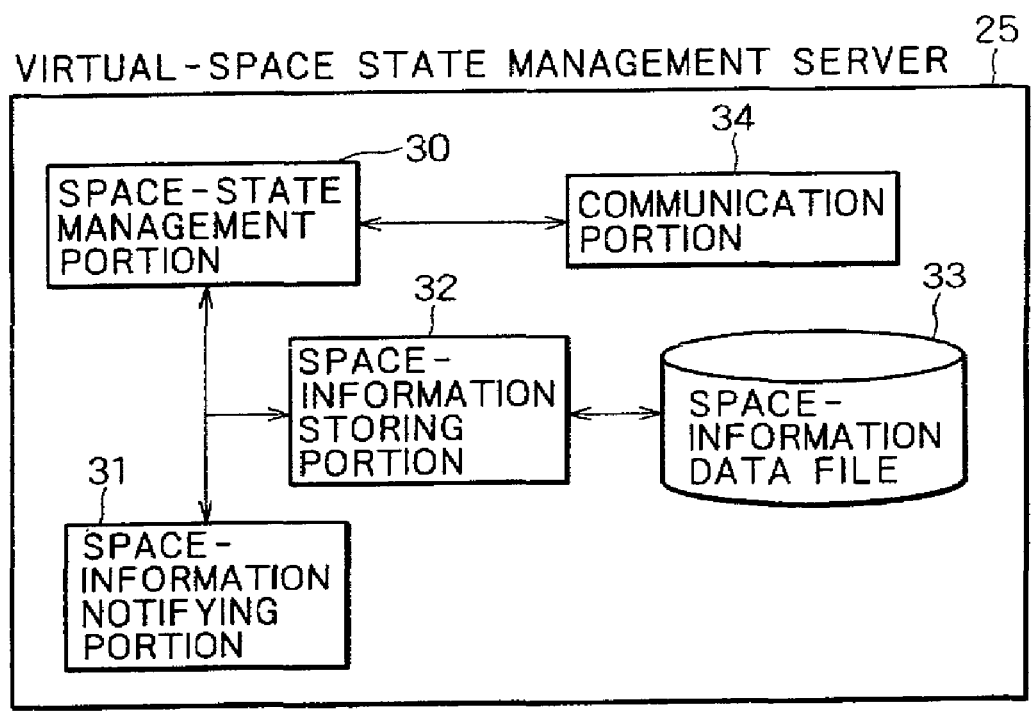
FIG. 8 is a block diagram illustrating a configuration of a virtual-space state management server.

As shown in FIG. 8, the virtual-space state management server 25 comprises a space-state management portion 30, a space-information notifying portion 31, a space-information storing portion 32, a space-information data file 33, and a communication portion 34. The space-state management portion 30 receives information about a commodity, which has been purchased in the real store by the user, from the communication portion 34. The information is originally supplied by a commodity managing system 28 of the real-store terminal 22 described later. The space-state management portion 30 instructs the space-information storing portion 32 to update the space-information data file that shows a space state of the user's virtual room (arranged furniture, their positions, etc.). According to the above-mentioned instruction, the space-information storing portion 32 updates the space-information data file 33, which shows a space state of the user's virtual room, in response to information on the commodity. To be more specific, the space-information data file is information that shows what kind of furniture, ornaments, and the like, exist in the user's virtual room, and that shows their sizes, positions, and the like. When the user purchases a commodity in the real store, a virtual commodity corresponding to the real commodity will be placed in the virtual room.

In addition, the space-state management portion 30 instructs the space-information storing portion 32 to read the space-information data file 33, which shows a space state of the virtual room of the appropriate user, in response to an information acquisition request from the virtual-space shared server 26, which has been received via the space-information notifying portion 31. According to the above-mentioned instruction, the space-information storing portion 32 supplies the space-information notifying portion 31 with the space-information file 33 that shows a space state of the virtual room of the appropriate user. The space-information notifying portion 31 notifies the virtual-space shared server 26 by providing the virtual-space shared server 26 with the space-information data file 33.

Figure 9:
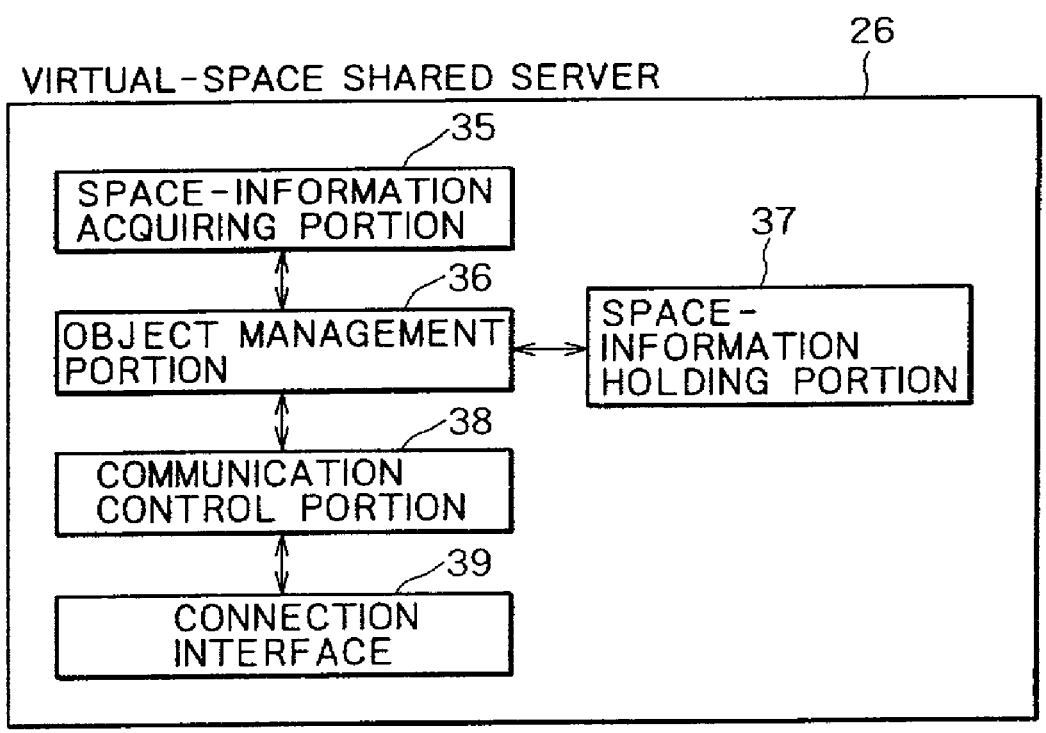
FIG. 9 is a block diagram illustrating a configuration of a virtual-space shared server.

As shown in the FIG. 9, the virtual-space shared server 26 comprises a space-information acquiring portion 35, an object management portion 36, a space-information holding portion 37, a communication control portion 38, and a connection interface 39. When the user accesses via the connection interface 39 and the communication control portion 38, the object management portion 36 transmits an information acquisition request to the space-information acquiring portion 35 in order to obtain the space-information data file 33 that shows a space state of the virtual room of the user. The space-information acquiring portion 35 transmits the above-mentioned information acquisition request to the space-information notifying portion 31 of the virtual-space state management server 25, and then receives the space-information data file 33, which responds to the above-mentioned information acquisition request, from the virtual-space state management server 25. The object management portion 36 holds the space-information data file 33, which has been obtained by the above-mentioned space-information acquiring portion 35, in the space-information holding portion 37. The object management portion 36 also notifies a virtual-space browser 24, which is installed in the user terminal 20, via the communication control portion 38 and the connection interface 39.

Figure 10:
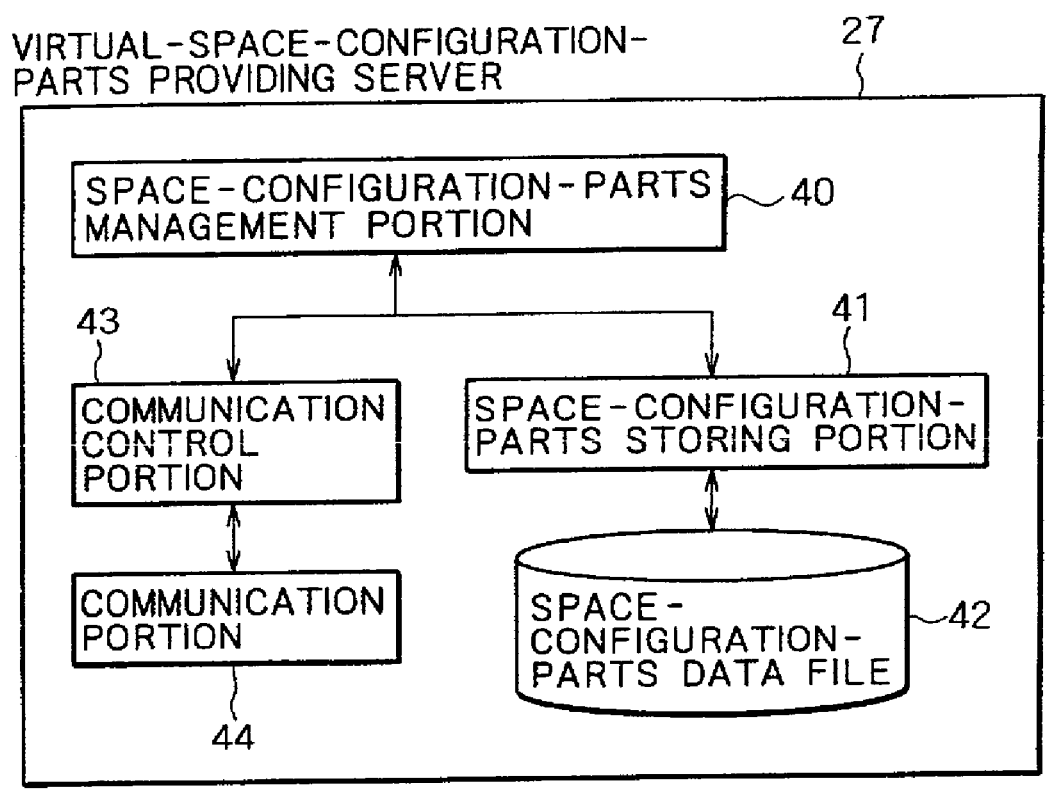
FIG. 10 is a block diagram illustrating a configuration of a virtual-space-configuration-parts providing server.

As shown in FIG. 10, the virtual-space-configuration-parts providing server 27 comprises a space-configuration-parts management portion 40, a space-configuration-parts storing portion 41, a space-configuration-parts data file 42, a communication control portion 43, and a communication portion 44. For each user's virtual room, the space-configuration-parts management portion 40 holds configuration parts used for a virtual space, which corresponds to a commodity in the real store, as a space-configuration-parts data file 42 using the space-configuration-parts storing portion 41. The space-configuration-parts management portion 40 returns space-configuration-parts data, which will be placed in the appropriate virtual room, from the space-configuration-parts data file 42 to the virtual-space browser 24 of the user terminal 20 via the communication control portion 43 and the communication portion 44 according to a request from the virtual-space browser 24 of the user terminal 20.

Figure 11:
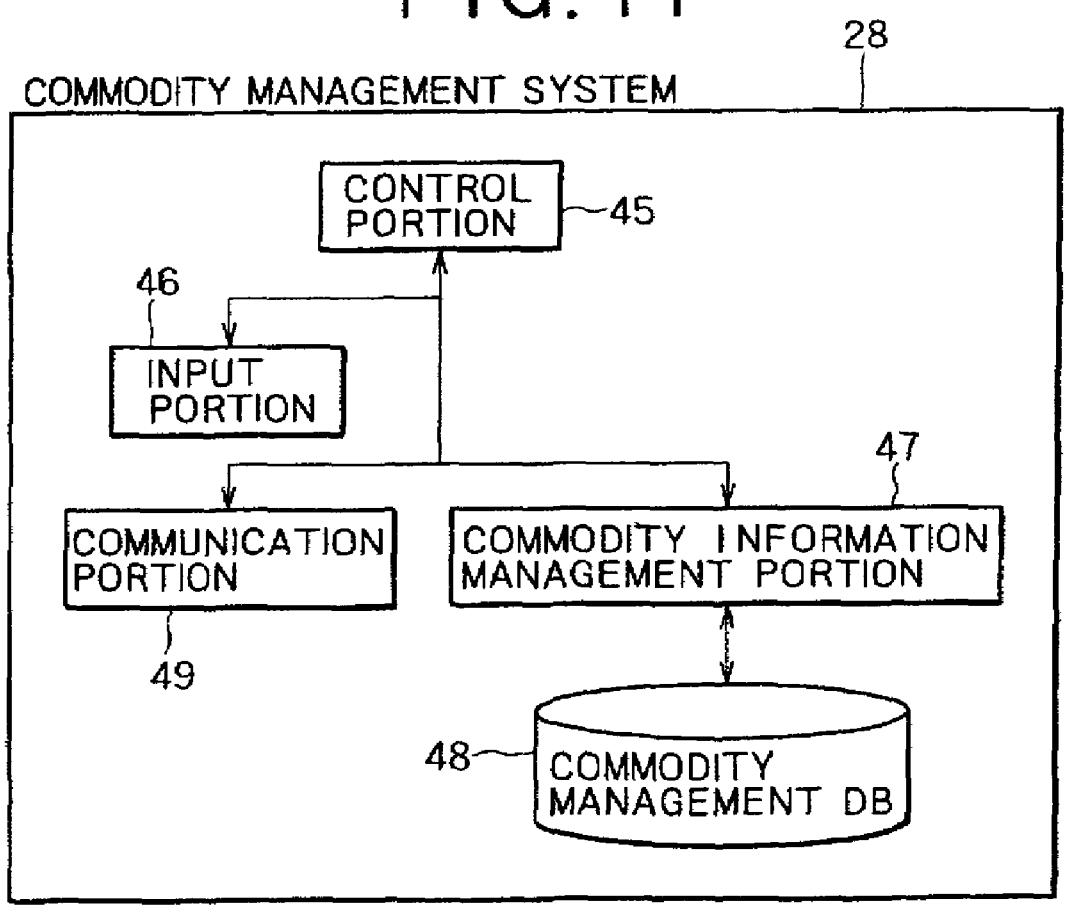
FIG. 11 is a block diagram illustrating a configuration of a real-store commodity management system.

As shown in FIG. 11, the real-store terminal 22 comprises a commodity management system 28 having a database that operates in conjunction with a virtual-space state management server 25 on the CP server 21. The commodity management system 28 comprises a control portion 45, an input portion 46, a commodity information management portion 47, a commodity management database 48, and a communication portion 49. The control portion 45 manages sales and stock of commodities using the commodity information management portion 47. The commodity management database 48 manages prices, stock quantities, and the like, concerning commodities. In addition, when the input portion 46 receives an input informing that the user has shopped in the real store, the control portion 45 transmits commodity information on the commodity management database 48 to the virtual-space state management server 25 via the communication portion 49.

As shown in FIG. 12, the virtual-space browser 24 comprises a communication control portion 50, a connection interface 51, a communication portion 52, an object management portion 53, a space-configuration-parts holding portion 54, a space-information holding portion 55, a space display portion 57, and an input portion 56. For the connection interface 39 of the virtual-space shared server 26, the object management portion 53 invokes a user's own virtual room on the virtual space via the connection interface 51 using the communication control portion 50. The object management portion 53 also receives space information, which shows a space state of the virtual room, from the virtual-space shared server 26. In addition, using the communication control portion 50, via the communication portion 52, and according to the above-mentioned space information, the object management portion 53 requests the communication portion 44 of the virtual-space-configuration-parts providing server 27 to acquire configuration-parts data of the virtual room. Moreover, the object management portion 53 also receives configuration-parts data from the virtual-space-configuration-parts providing server 27. The space-configuration-parts holding portion 54 holds the above-mentioned configuration-parts data. Additionally, the space-information holding portion 55 holds the above-mentioned space information. The input portion 56 is a keyboard, a mouse, or the like, by which the user inputs an instruction. The space display portion 57 comprises a CRT, a liquid crystal display device, or the like. Under the control of the object management portion 53, the space display portion 57 displays a virtual room according to space information held in the space-information holding portion 55 and configuration-parts data held in the space-configuration-parts holding portion 54.

Operation of Second Embodiment

Next, operation of the second embodiment described above is explained. Here, FIG. 13 is a conceptual diagram for explaining operation of the second embodiment.

When the user shops in the real store, information about the purchased commodity is supplied from the commodity management system 28 to the virtual-space state management server 25 (1 in FIG. 13).

The user starts up a virtual-space browser 24 on the user terminal 20 in the user's house, or the like, and then invokes a user's own virtual room on the virtual space (2 in FIG. 13).

The virtual-space shared server 26 requests the virtual-space state management server 25 to acquire information about a space state corresponding to the user's virtual room (3 in FIG. 13).

The virtual-space state management server 25 returns information such as furniture, which exists in the user's virtual room, to the virtual-space shared server 26 (4 in FIG.

13). In this case, the returned information includes commodity information supplied from the commodity management system 28.

The virtual-space shared server 26 notifies the virtual-space browser 24 of the user terminal 20 about a state of the virtual room (5 in FIG. 13).

According to the information obtained from the virtual space shared server 26, the virtual-space browser 24 requests the virtual-space-configuration-parts providing server 27 to acquire configuration parts of the virtual room (6 in FIG. 13).

The virtual-space-configuration-parts providing server 27 returns the virtual space configuration parts requested to the virtual-space browser 24 of the user terminal 20 (7 in FIG. 13). The virtual space configuration parts include parts corresponding to the commodity purchased by the user in the real store, which has been supplied by the commodity management system 28. By the above-mentioned operation, the user can also place the commodity, which has been purchased in the real store, to the user's own virtual room on the virtual space. The user can thereby utilize the commodity in the virtual space.

While a preferred embodiment of the present invention has been described using specific terms, such description is for illustrative purposes only, and it is to be understood that changes and variations may be made without departing from the spirit or scope of the following claims.

What is claimed is:

1. A virtual-space providing apparatus, which is connected to a user terminal via a network, and which provides said user terminal with various kinds of services through a three-dimensional virtual space created in the network, said virtual-space providing apparatus comprising:

virtual room providing means for imitating a real room of a user using said user terminal, and for providing the virtual room, which can be browsed using the user terminal connected via the network, on the three-dimensional virtual space;

virtual store providing means for providing the user terminal connected via the network with the virtual store, said virtual store selling virtual commodities imitating real commodities, on the three-dimensional virtual space; and benefit-information transmitting means, wherein, when the user purchases a virtual commodity in the virtual store provided by said virtual store providing means using said user terminal, benefit information showing benefit of purchasing the virtual commodity is transmitted to said user terminal, wherein, when a virtual commodity is purchased in the virtual store using said user terminal, said virtual store providing means places the virtual commodity in the virtual room.

2. A virtual-space providing apparatus according to claim 1, wherein said virtual store providing means comprises accumulating means for accumulating virtual commodities as three-dimensional image data.

3. A virtual-space providing apparatus, which is connected to a user terminal via a network, and which provides said user terminal with various kinds of services through a three-dimensional virtual space created in the network, said virtual-space providing apparatus comprising:

virtual room providing means for imitating a real room of a user using said user terminal, and for priviting the virtual room, which can be browsed using the user terminal connected via the network, on the three-dimensional virtual space;

virtual store providing means for providing the user terminal connected via the network with the virtual store, said virtual store selling virtual commodities imitating real commodities, on the three-dimensional virtual space; and benefit-information transmitting means, wherein, when the user purchases a virtual commodity in the virtual store provided by said virtual store providing means using said user terminal, benefit information showing benefit of purchasing the virtual commodity is transmitted to said user terminal, wherein, when a commodity is purchased in the real store, said virtual store providing means places a virtual commodity imitating the real commodity in the virtual room, wherein, when a commodity is purchased in the real store, said virtual store providing means places a virtual commodity imitating the real commodity in the virtual room.

4. A virtual-space providing apparatus according to claim 3, wherein said virtual store providing means comprises an accumulating means for accumulating virtual commodities as three-dimensional image data.

5. A virtual-space providing system, which is connected via a network to a user terminal by a user, a real-store installed in a store in a real space, and a virtual-space provding apparatus providing said user terminal with various kinds of services through a three-dimensional virtual space, wherein said virtual-space providing apparatus comprises:

virtual room providing means for imitating a real room of the user using the user terminal, and for providing a virtual room, which can be browsed using the user terminal connected via the network, on the three-dimensional virtual space;

virtual store providing means for providing the user terminal connected via the network with a virtual store selling virtual commodities imitating real commodities, on the three-dimensional virtual space; and benefit-information transmitting means for transmitting benefit information to the user terminal, so that in the real space the user can get benefit of purchasing a virtual commodity, when the virtual commodity is purchased in the virtual store provided by said virtual store providing means; and said user terminal comprises:

a removable storage medium; and writing means for writing the benefit information transmitted from said benefit-information transmitting means, on said storage medium, wherein, when a virtual commodity is purchased in the virtual store by using the user terminal, said virtual store providing means places the virtual commodity in the virtual room.

6. A virtual-space providing system, which is connected via a network to a user terminal used by a user, a real-store terminal installed in a store in a real space, and a virtual-space providing apparatus providing said user terminal with various kinds of services through a three-dimensional virtual space, wherein said virtual-space providing apparatus comprises:

virtual room providing means for imitating a real room of the user using the user terminal, and for providing virtual room, which can be browsed using the user terminal connected via the network, on the three-dimensional virtual space;

virtual store providing means for providing the user terminal connected via the network with a virtual store selling virtual commodities imitating real commodities, on the three-dimensional virtual space; and benefit-information transmitting means for transmitting benefit information to the user terminal so that in the real space the user can get benefit of purchasing a virtual commodity, when the virtual commodity is purchased in the virtual store provided by said virtual store providing means; and said user terminal comprises:

a removable storage medium; and writing means for writing the benefit information transmitted from said benefit-information transmitting means, on said storage medium, wherein said real-store terminal comprises commodity information transmitting means for transmitting at least commodity information showing the purchased commodity, when a real commodity is purchased, to said virtual store providing means; and said virtual store providing means places a virtual commodity imitating the purchased commodity, in the virtual room according to the commodity information transmitted from said commodity information transmitting means.

7. A virtual-space providing method for providing a user terminal connected via a network, with various kinds of services through a three-dimensional virtual space created in the network, said method comprising the steps of:

providing a virtual room imitating a real room of the user using the user terminal, on a three-dimensional virtual space so that the virtual room can be browsed using the user terminal connected via the network; and providing a virtual store for selling virtual commodities, which can be placed in said virtual room, on the three-dimensional virtual space; wherein when a virtual commodity is purchased in said virtual store using said user terminal, benefit of purchasing the virtual commodity is given top said user terminal side so that the user can enjoy the benefit in a real store, wherein, when a commodity is purchased in the real store, a virtual commodity imitating imitates the purchased commodity, is placed in the virtual room.

* * * * *